July 30, 1957 M. C. HEMSWORTH 2,800,766
ANNULAR MEANS FOR CHANGING THE AREA
OF A VARIABLE EXHAUST NOZZLE
Filed Sept. 25, 1952 2 Sheets-Sheet 1
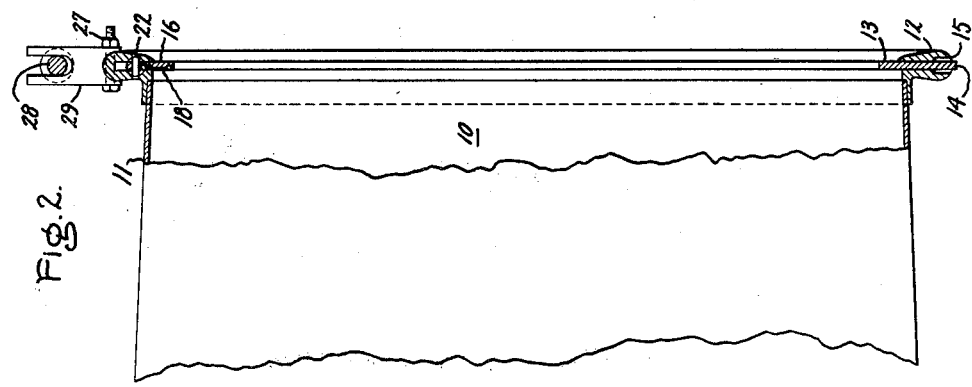
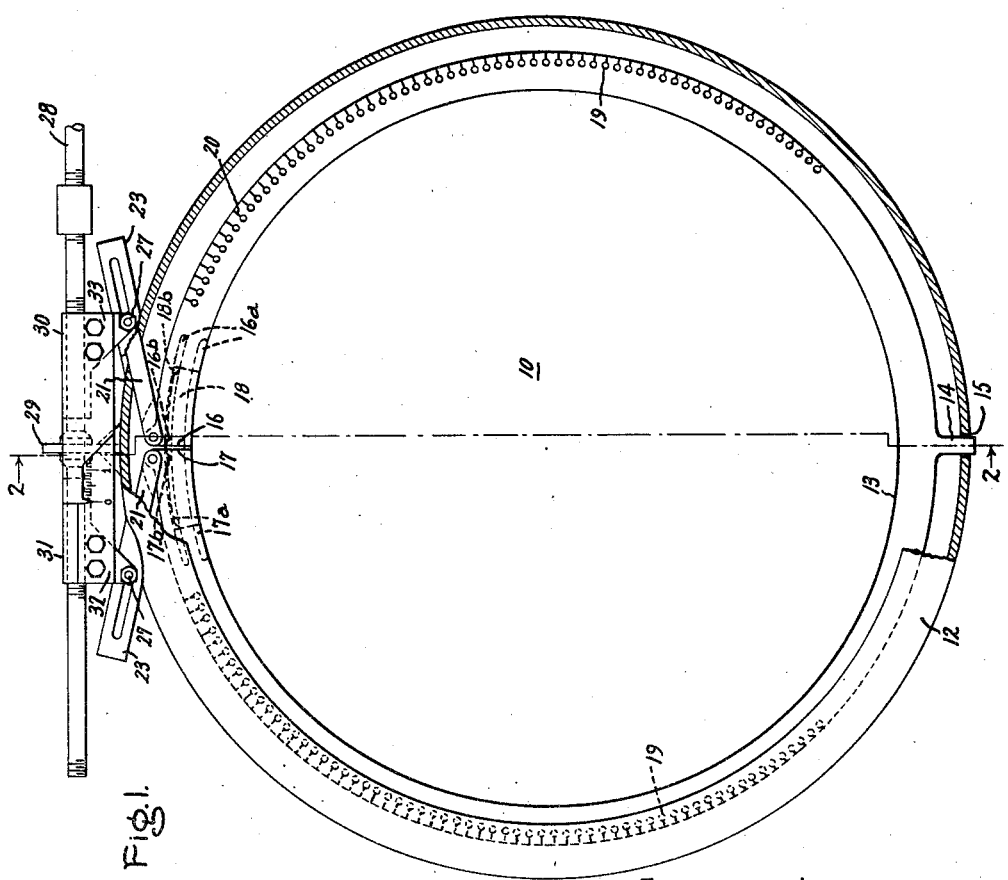
Inventor:
Martin C. Hemsworth,
by Richard E. Hosley
His Attorney.

July 30, 1957  M. C. HEMSWORTH  2,800,766
ANNULAR MEANS FOR CHANGING THE AREA
OF A VARIABLE EXHAUST NOZZLE
Filed Sept. 25, 1952  2 Sheets-Sheet 2
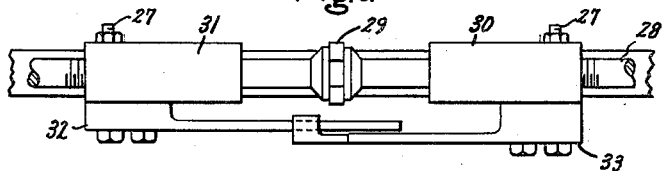
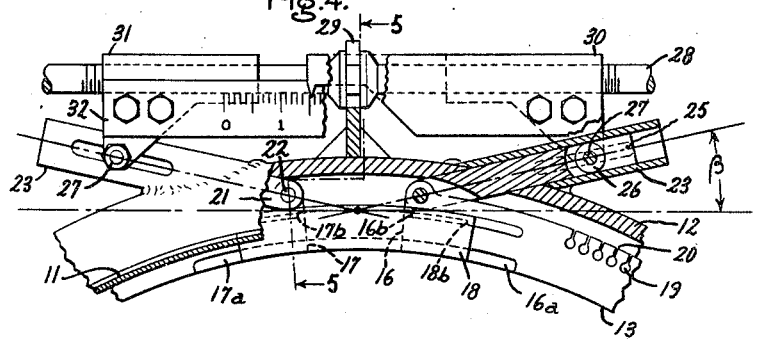 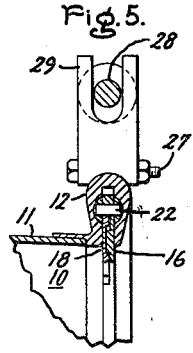
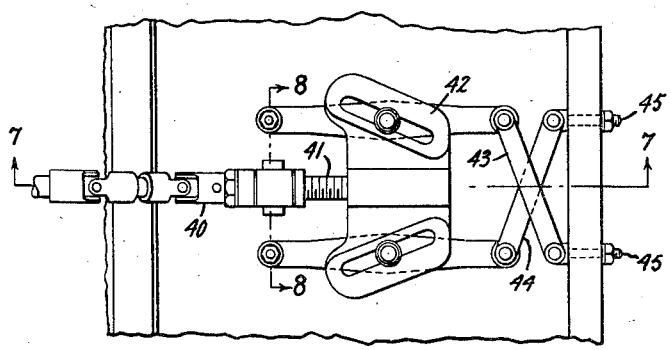
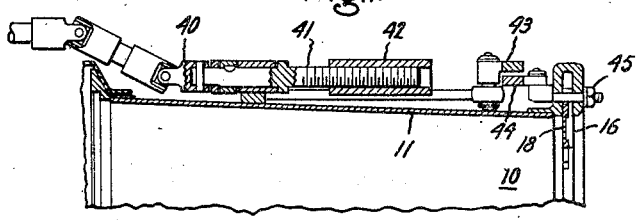 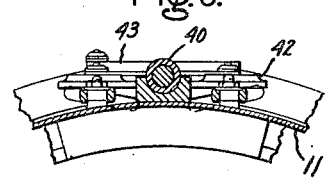
Inventor:
Martin C. Hemsworth,
by Richard E. Hosley
His Attorney.

United States Patent Office 2,800,766
Patented July 30, 1957

2,800,766

ANNULAR MEANS FOR CHANGING THE AREA OF A VARIABLE EXHAUST NOZZLE

Martin C. Hemsworth, Lockland, Ohio, assignor to General Electric Company, a corporation of New York Application September 25, 1952, Serial No. 311,355

12 Claims. (Cl. 60—35.6)

---

This invention relates to jet propulsion apparatus and specifically to an improved structure for the exhaust nozzle through which propelling gases are discharged.

In the usual construction of an aircraft gas turbine power plant, a compressor is used to supply pressurized air to a combustion apparatus which generates motive fluid to operate a turbine connected to the compressor, the motive fluid after passage through the turbine being discharged through a nozzle to furnish the jet propulsion thrust. Since this thrust depends upon the rate of combustion, governed by the speed of rotation of the turbine and compressor, and the mass and velocity of the motive fluid exhausted, and since it is desirable to maintain the speed of rotation of the turbine and compressor substantially constant so that the power plant can respond immediately to any sudden demand for an increase in thrust, variation of the exhaust nozzle area, and thereby, control of the velocity of the exhaust of the motive fluid, is a feasible method for quickly changing the thrust without appreciable change in rotational velocity of the turbine and of the compressor. Thus, to achieve maximum efficiency and performance under the various operating conditions, it is apparent that the area of the jet orifice (i. e. exhaust nozzle) should vary therewith.

When used in military aircraft, it is particularly advantageous to have a continuously variable exhaust nozzle on aircraft gas turbine power plants in order to effect rapid changes in thrust output. For example, on take-off of aircraft, a larger than normal thrust is required and may be obtained by reducing the exhaust nozzle area. Conversely, at cruising speed, efficiency is desirable and obtainable by increasing the nozzle area.

The variation in the nozzle area should not be so great that the flow of the exhaust is disturbed or obstructed. Furthermore, extensive movement of the nozzle restriction device is unnecessary because of the vena contracta effect, making the effective nozzle area less than the actual geometric area. In addition, internal obstruction of the exhaust flow is complicated by the high temperature thereof; consequently, an operating mechanism for any nozzle restriction device is greatly simplified if positioned outside of the area of the exhaust flow.

Accordingly, it is an object of my invention to provide a new and improved adjustable nozzle structure for a jet propulsion apparatus which is light and simple in construction, easy to control and efficient in operation.

Another object of this invention is to provide an improved adjustable means for regulating the propulsive exhaust from an aircraft gas turbine power plant.

A further object of my invention is to provide control means for varying the velocity of the exhaust of a jet propulsion device without a change in the rate of combustion therein.

Still another object of invention is to provide a continuously variable exhaust nozzle which has the least effect on the pattern of the exhaust jet.

Another object of invention is to provide an improved variable area nozzle which can be adjusted easily and with a minimum of mechanical operation.

And another object of invention is to provide an improved variable exhaust nozzle which can be used to compensate for small variations in engine characteristics.

These and other objects and advantages of my invention will become apparent from the following description and accompanying drawings, illustrating a preferred form of my improved variable exhaust nozzle, wherein Fig. 1 is an elevation view, partly in section, of my variable exhaust nozzle, Fig. 2 is a sectional view of the nozzle structure taken along line 2—2 of Fig. 1, minus the indicating structure, Fig. 3 is an enlarged fragmentary plan view of a screw jack actuating mechanism for controlling the variation of the nozzle area, Fig. 4 is an enlarged fragmentary elevation view of a screw jack actuating mechanism for controlling the variation of the nozzle area, Fig. 5 is a sectional view of a screw jack actuating mechanism for controlling the variation of the nozzle area taken along line 5—5 of Fig. 4, minus the indicating structure, Fig. 6 is an enlarged fragmentary plan view of a scissors-type actuating mechanism for varying the nozzle area, Fig. 7 is a sectional view of a scissors-type actuating mechanism taken along line 7—7 of Fig. 6, and Fig. 8 is a sectional view of a scissors-type actuating mechanism taken along line 8—8 of Fig. 6.

The objects of my invention may be realized by the provision of means for adjusting the effective jet nozzle area by varying the diameter thereof.

Referring to the figures in the drawing, wherein like numbers refer to like or similar members, the exhaust area of a jet propulsion apparatus is denoted generally at 10 and the extension of the exhaust nozzle or tail pipe at 11, to the open end of which is attached an annular U-shaped channel member or housing 12, with the legs of the U being disposed transverse the longitudinal axis of the exhaust nozzle 11 and defining a groove on the interior circumference of the housing.

A substantially annular split ring 13 is positioned in housing 12 and located therein by a projection or tongue 14 extending through opening 15 in housing 12, the projection or tongue 14 being midway between ends 16, 17, of the split ring. The ends 16 and 17 have concentric grooves extending circumferentially from their adjacent ends as at 16a and 17a, Fig. 4, one of these grooves having a stop at its outer end as at 16b and 17b, respectively. A floating closure 18, with projections 18a thereon (see Fig. 5) matching grooves 16a and 17a and having end stops as at 18b to cooperate with stops 16b and 17b, is used to cover the cutout portion of ring 13.

When ring 13 is deflected (either opened or closed) the magnitude of the bending moment at various locations of the ring will be variable. Hence it is desirable to provide a varying section modulus at various points of the ring to permit the ring to remain substantially circular during deflection thereof. This is accomplished by the provision of holes 19 in ring 13 as a paired series, which are located on a progressively smaller diameter towards the cutout portion of the ring, the series starting theoretically, externally tangent to the ring at the diametrical axis passing through the projection or tongue 14, the mid point of the ring, but for practical purposes, actually beginning at the point where the holes are calculated to become internally tangent to the ring. The series end in the vicinity of the grooves on the ends of the split ring, the holes on the smaller diameter being joined to the outer surface of the split ring by slits indicated at 20.

The free ends of the ring are moved towards or away from each other by push rods 21 (see Fig. 4) fastened to the ends of the ring by dowel pins 22 and sliding in guides 23. These push rods 21 have slotted ends to fit about the ends of the split ring and slotted ends at 25, within which moves roller 26, joined for movement with push rods 21 by means of fastening pins, such as bolts 27.

The push rods are actuated by a threaded mechanism similar to a turn buckle or screw jack consisting of rod 28, mounted in fulcrum 29 located diametrically opposite opening 15, carrying right-hand and left-hand threaded portions on either side of the fulcrum. Yokes 30 and 31, appropriately threaded, are screwed on the respective threaded portions of rod 28 and are joined to push rods 21 by fastening pins 27 which also join rollers 26 thereto. It is apparent that as the threaded rod 28 is rotated, yokes 30 and 31 move in or out, depending on the direction of rotation, symmetrically with respect to the diametrical axis passing through the fulcrum 29 and opening 15, the yokes controlling the movement of the sliding rods 21, to symmetrically contract and expand the inside diameter of ring 13 which is bent within the elastic limit of the material. This follows from the spacing of the series of drilled holes which reduce the section modulus of the ring about its mid point to allow the ring to retain a circular shape as the free ends are brought together or separated.

It has been determined that when the push rods 21 are correctly angled with the tangent to a circle concentric with the exhaust nozzle and passing through the point of intersection of the center lines through the push rods and ends 16 and 17 of ring 13, their motion will maintain the exhaust opening substantially concentric with the nozzle opening at all settings, since tongue 14 is free to slide radially in opening 15. This angle varies according to the area variation for which the nozzle is designed and for a ratio of maximum to minimum area of 1.22, it has been found equal to 12° 30' and is indicated as $\beta$ in Fig. 4.

If desired, an indicating structure, illustrated herein as comprising a scale 32, and a pointer 33, may be attached respectively to yokes 31 and 30 to show the extent of contraction or expansion of the split ring.

In Figs. 6, 7 and 8, there is disclosed a scissors-type actuating means for varying the diameter of split ring 13, indicated generally as 40 and comprising threaded member 41, yoke member 42 and scissors arms 43 and 44 joined to the ends of the split ring by bolts 45. Movement of the yoke member 42 to the right will cause the scissors arms 43 and 44 to move so as to open the split ring, and vice versa.

Thus, it will be seen that the invention provides a lightweight variable area nozzle structure which can be easily adjusted, is simply constructed but efficient in operation, and which produces a minimum disturbing effect on the flow of fluid therethrough.

It is to be understood that although various modifications and changes in structural details may be made in this invention without departing from the spirit and scope thereof as set forth in the appended claims, it is intended that this disclosure be interpreted as illustrative and not limitative.

What I claim as new and desire to secure by Letters Patent of the United States is:

1. A mechanism for varying the area of an exhaust nozzle of a jet propulsion device comprising an exhaust nozzle provided with a housing, a split substantially annular member positioned in said housing, means for moving said annular member in a plane transverse to the longitudinal axis of said exhaust nozzle and area, and means for limiting constriction of said member substantially concentrically with said longitudinal axis.

2. In a jet reaction propulsion nozzle, a structure for changing the effective exhaust nozzle area for varying the circumferential dimension thereof comprising, a split substantially annular member movable laterally with respect to the longitudianal axis of said nozzle, means for moving said annular member in said radial direction, said member being positioned in a housing adjacent to the exit thereof, and means for drawing the ends of said member in close proximity to each other, whereby substantially radial movement at all points results.

3. In a structure for varying the thrust from a jet reaction propulsion unit including an exhaust nozzle provided with a housing at the exit thereof, a contractible member for reducing the cross-section of said exhaust nozzle uniformly comprising a split ring positioned in said housing, and means for contracting said member comprising yoke members fastened to the respective ends of said ring and means for drawing said yoke members together whereby the area of said nozzle is reduced.

4. A reaction propulsion apparatus having an exhaust passage, adjustable nozzle means therefor comprising a nozzle communicating with said passage and means for varying the effective exhaust area of said nozzle including a channel shaped member attached to said nozzle at the exit thereof, a split annular member adapted to fit into said channel shaped member and means for changing the diameter of said annular member uniformly including yoke members attached to the ends of said annular member.

5. In a variable exhaust nozzle a thrust regulating mechanism therefor comprising a substantially U-shaped annular housing fastened to the end of said nozzle with the channel thereof on its inner circumference, a split, substantially annular member fitting within said housing, and means for constricting said annular member including a movable member attached to each of the respective ends of said annular member, and a threaded member for moving said last-mentioned members attached thereto.

6. An adjustable exhaust nozzle, an annular housing member fixed to said nozzle and having a groove with a radial opening therein adjacent the inner periphery thereof, a substantially annular, split ring member fitting within said groove and having a projection on the external circumference spaced substantially opposite the ends of said split ring member and adapted to fit within said opening in said groove for central positioning therein, yoke assemblies attached to the respective ends of said split ring member, a threaded actuating means joining said yoke assemblies, and a floating closure for said ends of said split ring member fitting within said groove whereby a substantially circular nozzle area is obtained.

7. An adjustable exhaust nozzle, means for changing the area of said nozzle comprising an annular housing attached to the exit thereof and having a groove on its inner periphery, said groove having a radial recess therein, a split ring encompassing an area less than that of said nozzle fitting into said groove, said ring having a projection on its outer periphery midway between the ends thereof for insertion in said radial recess whereby central positioning of said ring in said groove is attained, said ring having a series of openings communicating with its outer periphery for reducing the section modulus thereof whereby the circular shape of said ring is retained as said ends are moved, and threaded means attached to the ends of said ring for selective variation in the diameter thereof.

8. In combination with a reaction propulsion unit including an exhaust nozzle for providing a propulsive jet, structure for altering the area of said nozzle comprising an annular grooved housing attached to the exit of said nozzle and having a radial opening in the groove thereof and facing the interior of said nozzle, a split ring with grooved ends and a radial projection on its outer periphery at its mid-point thereon, said projection fitting into said opening for central location of said ring in said groove, said ring having a series of openings communicating with its outer periphery which are centered on a progressively smaller diameter approaching said ends of said ring, said openings starting at predetermined tangent points adjacent the diametrical axis extending through said projection on said ring and ending proximate said ends of said ring, means for varying the circumferential dimensions of said ring attached to said ends thereof including a threaded member for actuation of the movement of said ends, and a floating closure for said grooved ends of said ring.

9. In combination with a reaction propulsion apparatus having an exhaust nozzle therefrom, means for modifying the flow area of said nozzle comprising a substantially U-shaped annular channel member attached to the exit thereof with its groove on the inner periphery thereof and a radial opening in said groove, a substantially annular split ring having a radial projection at its midpoint on its outer periphery for insertion into said opening, said ring encompassing a smaller area than said flow area and being housed in said groove and having a series of circular openings on its outer periphery on both sides of its mid-point centered on a progressively smaller diameter as said series extend from selected points of tangency starting adjacent the diametrical axis through said radial projection to the immediate vicinity of the ends of said split ring, said openings being connected to the outer periphery by slits, a floating closure for said ends of said ring, and a threaded assembly joined to said ends of said ring for selective diametrical variation.

10. In a combination as set forth in claim 9, said threaded assembly comprising rods attached to said ends of said ring, guides surrounding said rods for controlling the motion thereof, threaded yoke members fastened to said rods, a member with threaded portions operatively joined to said yoke members, and a fulcrum for said last-mentioned member.

11. In a combination as set forth in claim 10, the center lines of said guides passing through said ends forming predetermined angles with the tangent to a circle concentric with said nozzle and passing through their intersection therewith whereby movement of said rods will symmetrically vary the circumferential dimension of said ring.

12. In combination with a jet reaction propulsion nozzle, a device for substantially concentric constriction of the flow area of said nozzle comprising a housing member attached to the end of said nozzle and having an internal groove substantially transverse the direction of flow in said area, said groove having a radial opening therein, a substantially annular split ring surrounding an area less than said flow area fitting into said groove and having an external radial projection at its mid-point and series of openings on its outer periphery starting at predetermined points of tangency on each side of the radial line through said radial projection and extending close to the ends of said ring, said openings being circular and centered on a smaller diameter approaching said ends and being joined to the outer periphery of said ring by slits whereby the section modulus of said ring is reduced to allow said ring to retain its circular shape as the free ends are moved, rods fastened to said ends of said ring for their movement, guides enclosing said rods, a yoke member with oppositely threaded portions fastened to each of said rods, a member with appropriately threaded portions upon which said yoke members are screwed, a fulcrum for mounting said last-mentioned member, and a floating closure for said ends, the center lines passing through said rods and guides forming predetermined angles with the tangent to a circle concentric with said flow area and passing through their juncture point therewith whereby movement of said rods symmetrically moves said ends of said ring to maintain an orifice opening substantially concentric with said flow area.

References Cited in the file of this patent

UNITED STATES PATENTS

| | | |
|---|---|---|
| 81,257 | Cushman | Aug. 18, 1868 |
| 1,505,549 | Faerch | Aug. 19, 1924 |
| 2,360,019 | Ryan et al. | Oct. 10, 1944 |
| 2,515,948 | Cyr | July 18, 1950 |
| 2,565,854 | Johnstone | Aug. 28, 1951 |

FOREIGN PATENTS

| | | |
|---|---|---|
| 919,004 | France | Feb. 25, 1947 |